United States Patent
Cook et al.

(10) Patent No.: US 6,898,597 B1
(45) Date of Patent: May 24, 2005

(54) EVENT LOG

(75) Inventors: Gail A. Cook, San Carlos, CA (US); Atul B. Mahajan, Santa Clara, CA (US)

(73) Assignee: Insweb Corporation, Redwood City, CA (US)

( * ) Notice: Subject to any disclaimer, the term of this patent is extended or adjusted under 35 U.S.C. 154(b) by 0 days.

(21) Appl. No.: 09/437,890

(22) Filed: Nov. 9, 1999

(51) Int. Cl.[7] ............................................. G06F 17/30
(52) U.S. Cl. ............................................ 707/10; 707/3
(58) Field of Search .................... 707/1–10, 100–154.1, 707/200–205; 705/9, 14, 34, 19, 77, 40, 79; 709/250, 224, 203

(56) References Cited

U.S. PATENT DOCUMENTS

| | | | |
|---|---|---|---|
| 5,884,312 A | * | 3/1999 | Dustan et al. ................ 707/10 |
| 6,108,662 A | * | 8/2000 | Hoskins et al. ............. 707/102 |

FOREIGN PATENT DOCUMENTS

| | | | |
|---|---|---|---|
| WO | WO 98/11702 | | 3/1998 |
| WO | WO 98/38614 | * | 9/1998 |

* cited by examiner

*Primary Examiner*—Mohammad Ali
(74) *Attorney, Agent, or Firm*—Campbell Stephenson Ascolese LLP; Marc R. Ascolese

(57) ABSTRACT

An event logging system that monitors for the occurrence of predefined web site usage events having some business significance, records the occurrence of those events, and also records the events' associated context information can advantageously address shortcomings of the prior art. The system includes a software event identification routine, executing within web server software or other web-related application software, that monitors for the occurrence of an event and gathers a desired set of related context information. A database interface, usable by one or more distinct web servers or applications, is used to insert the information into an event database. The event database can later be processed to add, modify, or delete event data, as well as prepare the data for integration into other databases or the preparation of reports.

30 Claims, 5 Drawing Sheets

FIG. 3A

| | Event ID | Timestamp | Program | Site Session | Shopping Session | Quoting Session | Consumer ID | Delivery Data Snapshot | Account | Carrier | Quote Amount | Evaluation Reason | Sponsor | Label | Package | Location | Banner |
|---|---|---|---|---|---|---|---|---|---|---|---|---|---|---|---|---|---|
| Initiate_Site_Session | X | X | X | X | X | | | | | | | | X | X | X | X | X |
| Initiate_Shopping_Session | X | X | X | X | X | | | | | | | | X | X | X | X | X |
| Create_New_Profile | X | X | X | X | X | X | | | | | | | X | X | X | X | X |
| Select_State | X | X | X | X | X | X | | | | | | | X | X | X | X | X |
| Complete_Filter | X | X | X | X | X | X | X | | X | | X | | X | X | X | X | X |
| Complete_Rating | X | X | X | X | X | X | X | | X | X | X | | X | X | X | X | X |
| View_Quote_Details | X | X | X | X | X | X | X | | X | X | | | X | X | X | X | X |
| Initiate_Lead | X | X | X | X | X | X | X | X | X | X | | | X | X | X | X | X |
| Complete_Lead | X | X | X | X | X | X | X | X | X | X | | | X | X | X | X | X |
| Init_3rd_Party_Engine | X | X | X | X | X | X | X | | | | | | X | X | X | X | X |
| Complete_3rd_Party_Engine | X | X | X | X | X | X | X | | | | | | X | X | X | X | X |
| Initiate_Feedback | X | X | X | X | X | X | X | | | | | | | | | | |
| Complete_Feedback | X | X | X | X | X | X | X | | | | | | | | | | |
| Create_Account | X | X | X | X | X | | X | | X | | | | X | X | X | X | X |
| Login_Account | X | X | X | X | X | | X | | X | | | | X | X | X | X | X |
| Page | X | X | X | X | | | | | | | | | X | X | X | X | X |

EVENT LOG

BACKGROUND OF THE INVENTION

1. Field of the Invention

This invention relates to the client/server computing environment, and particularly recording information about user activity in a client/server computing environment.

2. Description of the Related Art

As more enterprises begin to, or expand their use of, the Internet and the World Wide Web (the "web") for business purposes, they need better information about the usage of their web sites (e.g., web server applications running on server computer systems) as well as better information about those accessing their web sites in order to improve their ability to do business.

Conventional systems for monitoring and analyzing web site activities tend to focus only on the final result of some activity and not the overall context in which the activity occurs. For example, some monitoring systems gather information about web site activity based on the outcome of a user's session, e.g., the information about a purchase made by a user of a web site enabled to process orders, but do not monitor interim steps, e.g., those products that a user began to purchase, but then canceled, or; products that were merely browsed.

Other monitoring systems focus on web traffic by maintaining web server logs or log files that record transactions or activities that take place on the web server. Web servers can passively gather access information about each user by observing and logging the data packets (e.g., transmission control protocol/internet protocol (TCP/IP) packets) exchanged between the web server and the user. An example of such information is an access (a "hit") to a particular hypertext markup language (HTML) file on a web site. Some information about the user and their activity can be determined directly or inferentially from log files, but log file based analysis is generally limited to activities associated with the mechanics of web site use and hypertext transfer protocol (HTTP) transfer, not the business context within which the activity takes place.

Compounding the shortcoming of existing web site monitoring systems, particularly log file implementations, is the fact that enormous quantities of data are gathered, but not necessarily useful business information. Thus, massive log files must be processed to extract useful information, a very time consuming and computer system resource intensive process.

Accordingly, it is desirable to have a web site monitoring system that can capture useful business activities or events, and the business context in which those activities or events occur. This should be accomplished while minimizing any performance impact on web server processes or web server side data collection processes, particularly the user experience (e.g., the speed with which an HTML document is made available to a user after the user has requested the document, or the ability to handle multiple users). Also, the monitoring system should be easily integrateable into web server processes or web server side data collection processes, while minimizing the amount of data that must be collected, stored, and ultimately analyzed.

SUMMARY OF THE INVENTION

It has been discovered that an event logging system that monitors for the occurrence of predefined web site usage events having some business significance, records the occurrence of those events, and also records the events' associated context information can advantageously address the aforementioned shortcomings of the prior art. The system includes a software event identification routine, executing within web server software or other web-related application software, that monitors for the occurrence of an event and gathers a desired set of related context information. A database interface, usable by one or more distinct web servers or applications, is used to insert the information into an event database. The event database can later be processed to add, modify, or delete event data, as well as prepare the data for integration into other databases or the preparation of reports.

Accordingly, one aspect of the present invention provides an event logging system for capturing event information associated with activity occurring in an application running on a server computer system configured to provide information to at least one client computer system. The event logging system includes an event identification routine and a database interface. The event identification routine is operable to identify the occurrence of an event during the execution of the application and to transmit context information associated with the event. The database interface is operable to transmit and receive the context information.

In another aspect of the invention, a method of logging event information associated with activity occurring in an application running on a server computer system configured to provide information to at least one client computer system is taught. An occurrence of a predefined event during the execution of the application is identified. Context information associated with the event is transmitted to a database.

BRIEF DESCRIPTION OF THE DRAWINGS

The present invention may be better understood, and its numerous objects, features, and advantages made apparent to those skilled in the art by referencing the accompanying drawings.

FIG. 3A is a matrix listing examples of events and associated context information.

DETAILED DESCRIPTION

Client/server computer systems operating in a distributed computing environment (e.g., web client/server computer systems) are routinely used to generate business or business leads for a variety of enterprises. One specific example of this type of business activity is providing insurance information to, and generating leads from users of a web based insurance site. (The focus throughout this application will be on insurance business applications, but those having ordinary skill in the art will readily recognize the applicability of many of the described techniques to a variety of different fields of business and web based client/server activities in general.) The information that is provided by the user varies depending on both the subject of the insurance policy to be underwritten and the type of coverage desired. For instance, in the case of automobile insurance, the information provided by the user includes information about the vehicle or vehicles to be covered under the policy, information about the driver or drivers to be covered under the policy, and information about the type of coverage requested by the user.

Figure 1:
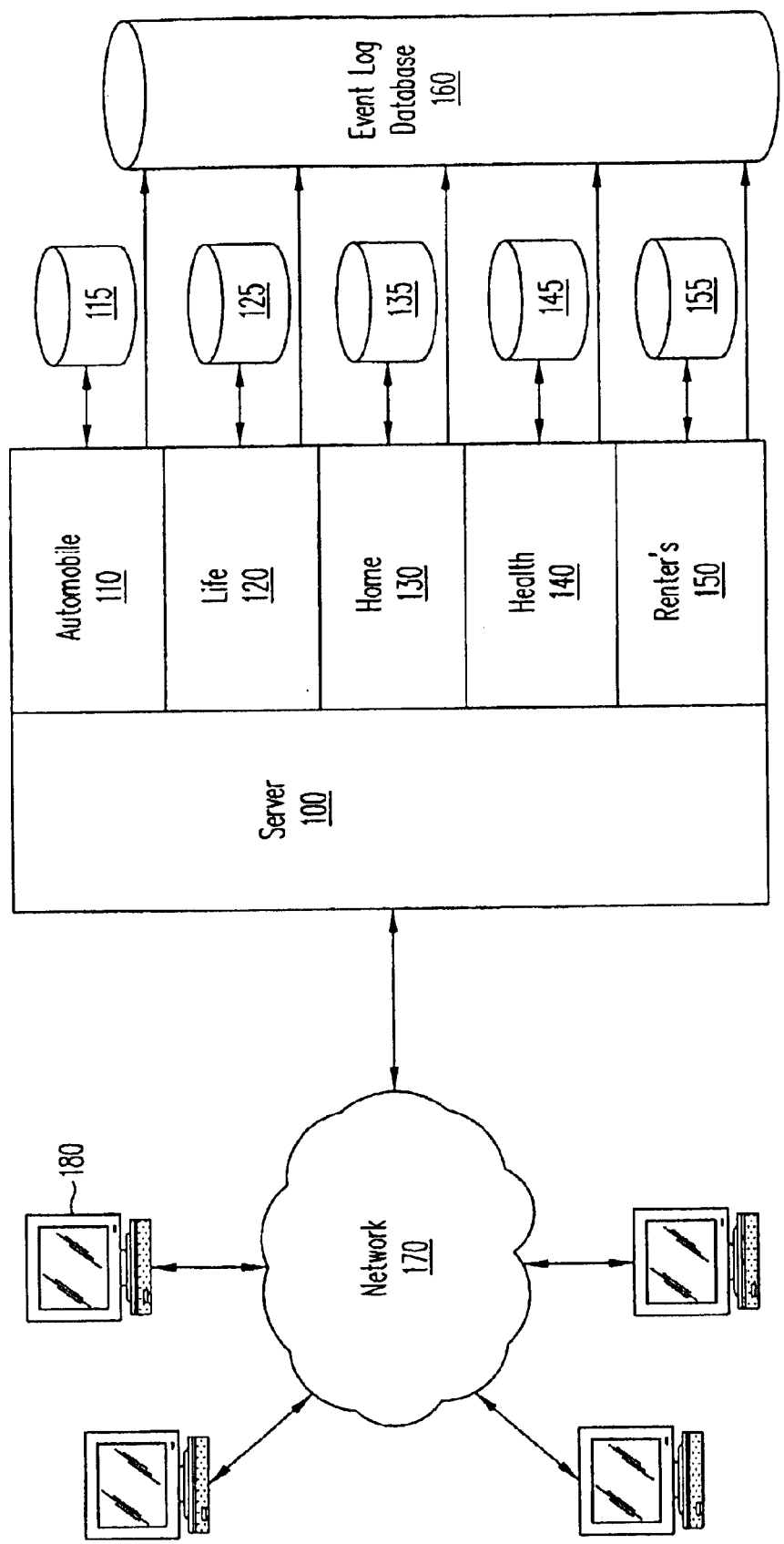
FIG. 1 illustrates a client/server computing environment utilizing an event logging system.

FIG. 1 illustrates a client/server computing environment for providing insurance product information to users via, for example, an interactive web site, and utilizing an event logging system. Server 100 is typically a web server including the necessary hardware and software to serve HTML documents, associated files, and scripts to one or more client computers systems 180 when requested by a user of, or an autonomous program executing on a client computer system. Client computer systems 180 typically utilize HTML browsers to display the HTML documents, and to generally interact with server 100. As illustrated, server 100 and clients 180 are coupled to each other through a communications network 170, such as the Internet. Server 100 and clients 180 can alternately be coupled to each other through point-to-point connections, or dedicated connections. Server 100 is typically an Intel Pentium-based or RISC based computer system equipped with one or more processors, memory, input/output interfaces, a network interface, secondary storage devices, and a user interface.

Server 100 includes five different insurance product applications executing on the server hardware: automobile insurance product application 110, life insurance product application 120, home insurance product application 130, health insurance product application 140, and renter's insurance product application 150. Each application provides users, through common web serving software, with functionality and content for different insurance products. As illustrated, insurance product applications 110, 120, 130, 140, and 150 execute on server 100, but one or more of these applications can execute on a separate application server coupled to server 100. Each insurance product application utilizes a respective product database 115, 125, 135, 145, or 155 to store data associated with that particular insurance product, although one or more insurance product applications can share a database. Moreover, each of insurance product applications 110, 120, 130, 140, and 150 includes some or all of the event logging system functionality, so that event identification and context information collection can be tailored to the business or management needs for a particular product. Insurance product applications 110, 120, 130, 140, and 150 share a common event log database 160 for recording events, although individual event log databases can be utilized for one or more of the insurance product applications. Additionally, any of databases 115, 125, 135, 145, 155, and 160 can reside on server 100, or on one or more separate computer systems coupled to server 100. The databases used, and the database management systems (DBMSs) used to allow access to and control of the databases can be based on a variety of database schemes, but are typically relational in nature, for example structured query language (SQL) databases and DBMSs.

Figure 2:
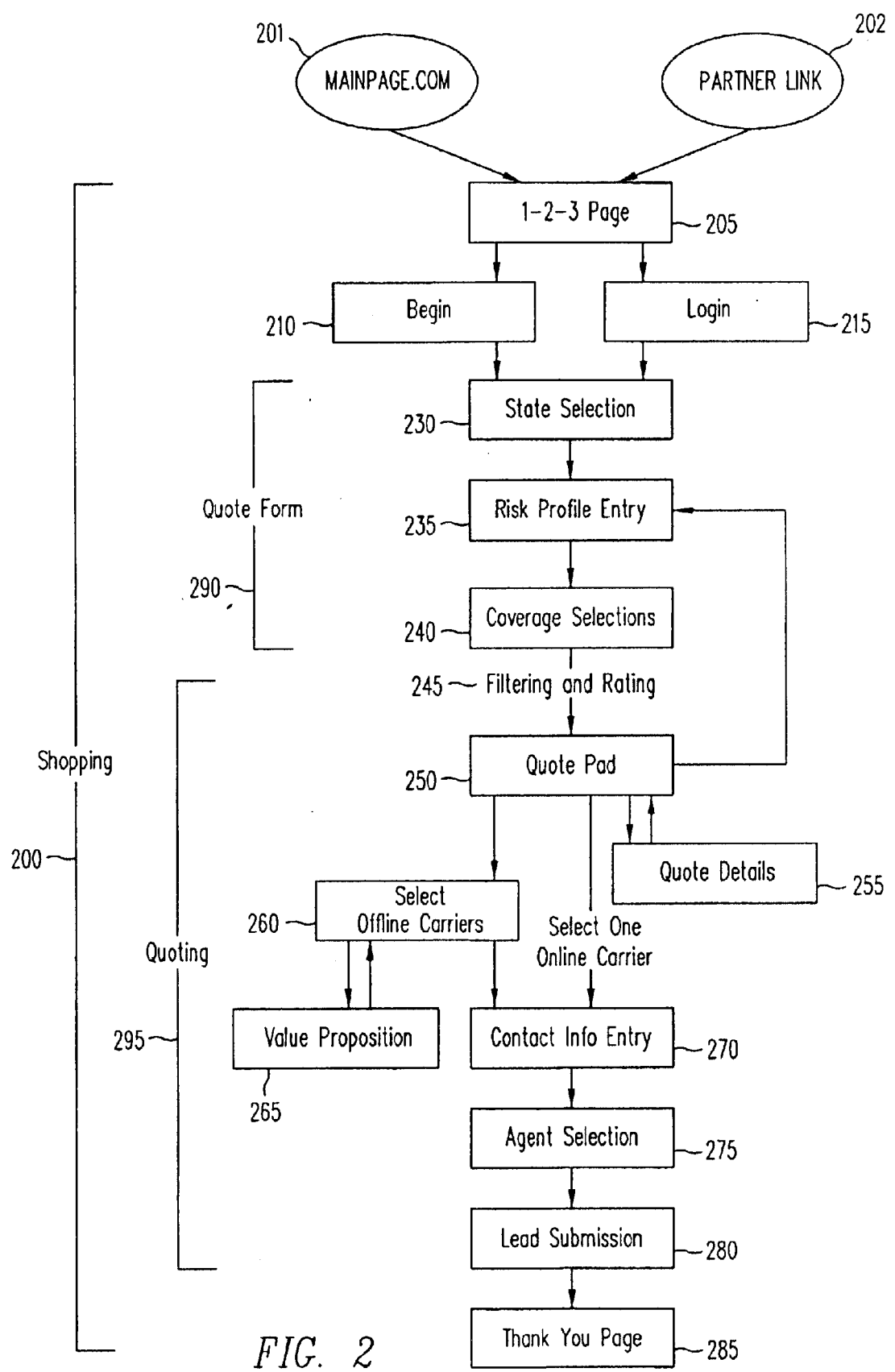
FIG. 2 is a functional diagram of the program flow for a typical insurance product application executing on, for example, a server, such as that illustrated in FIG. 1.

FIG. 2 is a functional diagram of the program flow for a typical insurance product application 110, 120, 130, 140, or 150 executing on, for example, server 100. The program flow illustrated in FIG. 2 is common to most insurance products, and includes a sequence of steps or phases in which a user interacts with the product application. Since insurance quotes are typically based on statistical data which is correlated to the information provided by a potential insured, computers can greatly reduce the time and expense associated with generating insurance quotes. In particular, computer quoting systems allow insurance agents to provide accurate quotes to potential clients in a matter of minutes by inputting the client's information into the system and automatically generating quotes based on the information provided by the client.

A user begins the process by entering the product application through the first page of the product, 1-2-3 page 205 via a hyperlink 201 located on the home page of a web server operating on server 100, or via a hyperlink 202 from another web site, such as a web site belonging to a business partner, portal, or search engine. The first page of the product 205 typically explains the process to follow. The user begins the data entry process either by accessing an existing account on the system (215) or by creating a new account and entering appropriate information about the user.

Because insurance requirements, laws, coverage, and costs vary significantly from state to state, the first step in obtaining quote information is to select a state of residence 230. Next, the user provides information about their risk profile 235. For example, if the user has entered the automobile insurance product application, 235 might be require automobile information, driving record information, and other personal information. In 240, the user provides information about the type and amount of coverage desired, e.g., deductible amount, maximum liability, etc.

Activities in 230, 235, and 240 are generally referred to as quote form activities 290 because they are analogous to traditional paper forms used to gather information needed to process an insurance quote request.

Once the quote form activities 290 are complete, a quoting session 295 is initiated. The process starts with filtering 245, in which the system evaluates a set of rules against the risk profile for each available product offered by an insurance carrier available in the program. Products that pass the filtering process are sent through a rating process to determine the appropriate quote for the user. Quotes are presented to the user via QuotePad 250. QuotePad 250 contains information about both on-line and off-line quotes available to the user. On-line quotes can be presented directly to the user by the insurance product application, and the QuotePad can include links to the providers associated with the on-line quotes. In some instances, a user can request detailed information about the quotes in 255. Still other information might include how to contact an agent or the provider via e-mail, telephone, or traditional mail. Off-line quotes are sent to the user by alternate means such as e-mail or regular mail at a later time, and are selected at 260. When the user selects one or more products for carrier submission, the product selection generates either a request for coverage (RFC or instant lead) or a request for quote (RFQ or delayed lead). With an RFC, the user has been presented with an instant quote for a product. For an RFQ, a carrier is responsible for generating a quote and returning it to the user. Once a user has selected a product for lead submission, information must be collected such as contact information 270 that enables a carrier to respond to the user, or agent selection 275. In 280 the lead is submitted to the carrier, and in 285 an appropriate message is displayed, thanking the user. The process also allows for specialized marketing such as value proposition 265. A value proposition page can include the presentation made by a carrier to users regarding products offered by the carrier. The activities described in FIG. 2 can collectively be described as a shopping session 200.

The act of a user reaching certain places in an insurance product application while navigating the web site (as illustrated in FIG. 2) and which has an immediate and/or distant business importance can be termed an event. Events typically, although not always, are the result of consumer interaction with the application/web server system. Some samples of events include submission of a lead, creation of an account, and the result of a filtering session. The event logging system captures these events in support of an overall reporting process. Each event occurs within a certain context. For example, a user uses a particular insurance product application, leads are associated with a given carrier, and most events are a result of certain information or actions of a user. The context information should be captured, in addition to the mere occurrence of an event, in order to make the information about the event more meaningful and useful to business.

The information captured by the event logging system can be used in a variety of ways. It can provide raw counts of certain information and/or activities, such as the number of leads, the number of accounts created, session statistics, users who passed/failed filtering for a given carrier, results of rating, quotes viewed, value proposition viewed, and leads submitted. Event log information can be used to establish sets of data for more detailed reporting. For example, if a report based on activity in automobile insurance product application 110 is desired to include average ages of all drivers broken down by state for leads submitted in a given time period, the event log can provide the data to establish the reporting set. While the event log typically will not include age, it will typically include index information such as a user identification (ID) and session ID. A reporting process can use this index information to access age and state information in the appropriate product database, e.g., database 115. Additionally, the information in the event log can be used to reconcile data from different sources both inside and outside the overall system.

The table below lists a variety of common fields (and their description) used to 10 provide the context information associated with each event.

| Event Field | Description |
| --- | --- |
| Site Session ID | A unique ID for each user session on the web site |
| Shopping Session ID | A unique ID for each user session within a product |
| Event ID | The ID for an event |
| Event Type | An ID for the type of event |
| Timestamp | Time-stamp when the event occurred |
| Program ID | ID of the product application used |
| Consumer ID | ID of the user/consumer using the product |
| Location ID | ID of web site from which the user came |
| Package ID | ID of package having sponsor, label, and program information |
| Banner ID | ID of a banner from another web site linking to the product application |
| Carrier ID | ID of the insurance carrier offering quotes |
| Carrier Display Order | The order in which carrier information is displayed on the Quote Pad |
| Product ID | ID of a product offered by a carrier |
| Tier ID | ID of a sub-product or plan within a product offered by a carrier |
| State | The state where the user wants coverage |
| Filter Decline Reason | The reason ID for which a user was not filtered |
| Quote Amount | The premium amount quoted to a user |
| Vehicle No. | Number of vehicles (insurable units) calculated by the event log back end |
| Appl Server | Name of the application server on which the insurance product application ran |
| Quoting SID | ID generated by the event log back end to label events within a quoting session |

Note that this table is-by no means exhaustive. A variety of other pieces of context information can be captured depending upon the business needs associated with the application. Any particular event may cause the capture of data for one or more of these fields, but not necessarily all of the fields. Additionally, and as further described below in association with FIG. 4, data capture can occur at the front end, i.e., at the level of the insurance product application, or at the back end, i.e., at the level of an event log database post-processor.

Figure 3:
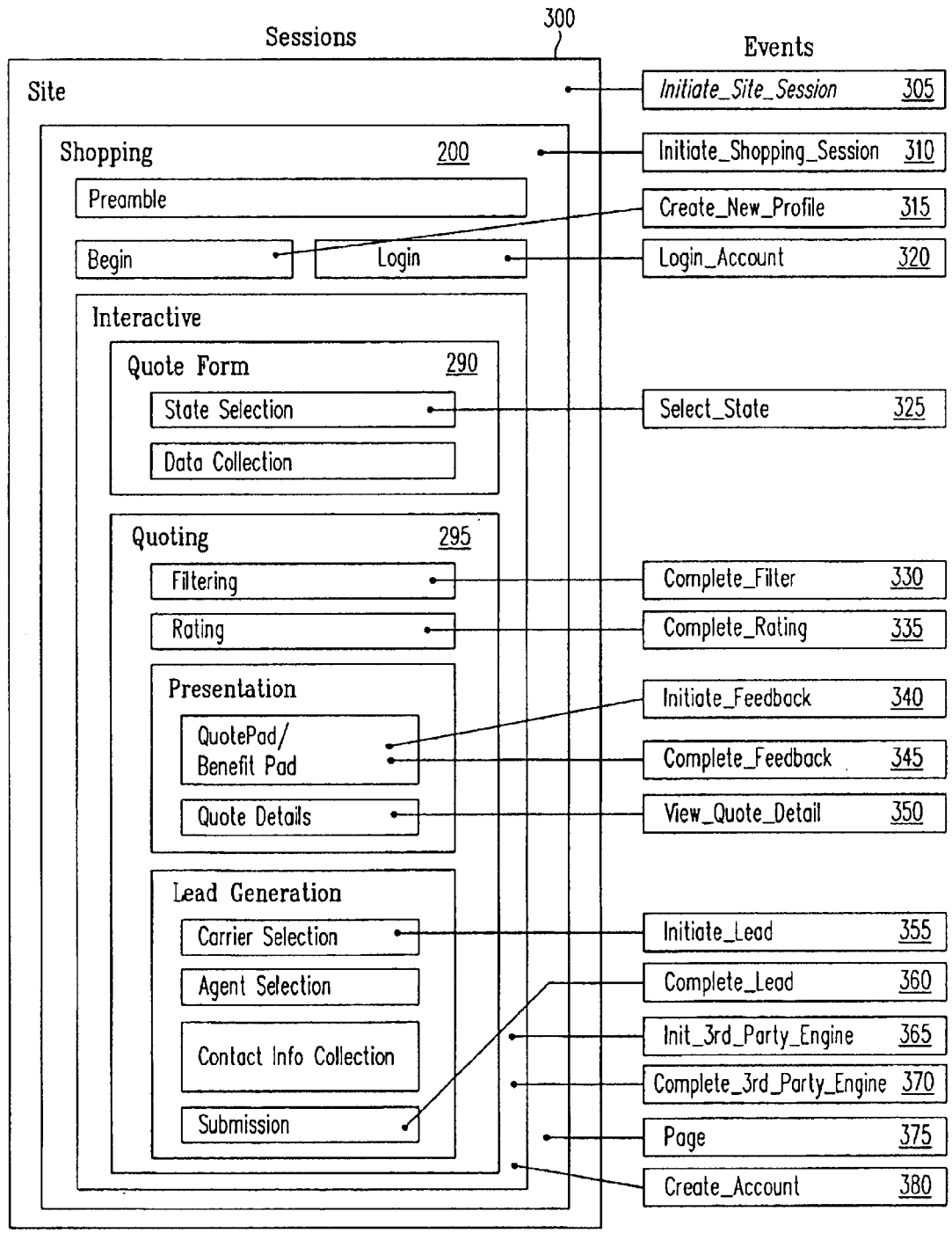
FIG. 3 illustrates typical sessions and events associated with the program flow illustrated in FIG. 2.

FIG. 3 illustrates typical sessions and events associated with the program flow illustrated in FIG. 2. Site session 300 begins when a user comes to the web site, triggering the Initiate_Site_Session event 305. Note that FIG. 3A is a matrix 390 listing examples of events 392 and associated context information 394. Use of a particular context information field by a particular event is indicated in the matrix by an X 396. Shopping session 200 begins when the first web page associated with an insurance product application is accessed, thus triggering the Initiate Shopping Session event 310. A user who performs a login using an existing account will trigger Login_Account 320, while a user who creates a new profile/account activates Create_New_Profile event 315. When the user is performing quote form activity 290, events can be recorded such as Select_State 325. After the filtering process evaluates the set of rules against the risk profile for each available product offered by a given carrier, Complete-Filter event 330 is recorded. Complete_Rating 335 occurs when a rating engine has completed for a given carrier. When a user initiates the feedback process associated with one or more quotes provided via the QuotePad, Initiate-Feedback event 340 occurs, and when feedback information has been submitted, Complete_Feedback 345 is recorded. If a user chooses to view a quote detail, that information is recorded as View_Quote_Detail event 350. Lead generation events include Initiate Lead 355 (when the user has selected a carrier for follow-up), and Complete_Lead 360 (when the user has submitted a lead of a carrier). Init_3rd_Party_Engine 365 is triggered when a third party engine is invoked to performed a process external to the insurance product application. Similarly, Complete_3rd-Party_Engine 370 is recorded when the external process is completed. Page event 375 is recorded when a particular web page is displayed to a user. Create_Account 380 indicates that the user has successfully created a new account.

Additional events can, of course, be added as desired. If an event has multiple outcomes an event type is also recorded to cite the specific outcome for a given user. As illustrated in FIG. 3A, not all events utilize all available context information fields. Additionally, event definitions, including when/where they occur and what context information is needed can vary from application to application.

Figure 4:
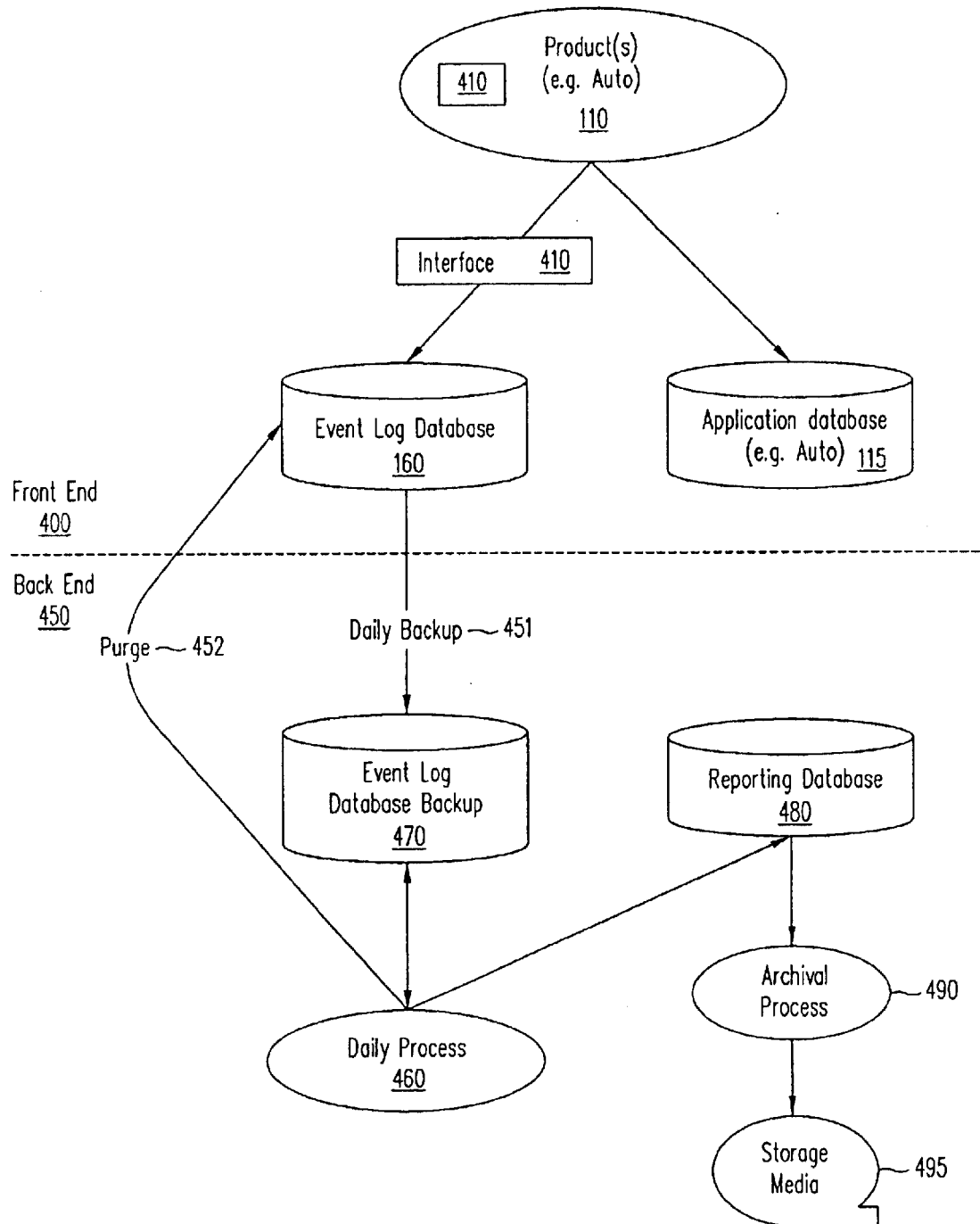
FIG. 4 illustrates many of the components of an event logging system.

FIG. 4 illustrates an implementation of the event logging system. Front end 400 includes an insurance product application such as automobile insurance product application 110. Application 110 includes event identification routine 410 to signal the occurrence of an event, and to gather the appropriate context information for that event. Routine 410 creates an event table, and populates the table with context information as required by the particular event.

The event information (e.g., an event table) is passed to database interface 410 for placement into event log database 160. Where the event log database is implemented as a SQL database, database interface 410 can be a SQL stored procedure which is a precompiled collection of SQL statements stored under a name and processed as a unit. Stored procedures are typically used for managing SQL databases and displaying information about databases and their users. Alternately, interface 410 can be another type of program, or a part of application 110 itself. Where interface 410 is separate from application 110, enhanced modularity is achieved because the same interface can be used by a variety of product applications.

As mentioned above, it is desirable that the front end processes have a minimal impact on the performance of the web server and/or the product application. Consequently, some data processing, including event table populating is deferred to back end processes such as daily process 460. In addition to daily process 460, the back end 450 includes both a daily backup 451 of event log database 160 to event log database backup 470. Daily process 460 typically occurs on a batch basis, and uses information form event log database 160 to produce reporting database 480. Archival process 490 is part of the normal maintenance of system data, and typically includes storage to storage media 495.

Daily process 460 performs a variety of functions, as indicated by for example, data purge 452. The daily process can correct for systematic data or reporting errors; it can replicate or ripple event context information from one event to another, thereby requiring less information to be recorded at the time-sensitive front end; and it can add new information such as new events and their context. For example, if two events occur during the same session, some of the event context information can be identical. By replicating such information on the back end, the duplicate context information need only be recorded once.

Another example of daily process 460's ability to massage data occurs with respect to a session timestamp. For batch processing and reporting purposes, it is often useful to group events based on a logic entity, such as a shopping session. Initiate_Shopping_Session event 310 has an associated timestamp, but because a shopping session might begin hours before sub-events occur (e.g., a quoting session), events associated with the logical entity can span batch processing windows. To force events that occurred during one batch processing window to appear to have occurred during another, and thus preserve all of the data for a particular logical entity, daily process 460 can force various events to have the same session timestamp, and group events by that information rather than some other information, such as actual timestamp. Daily process 460 can, for example, be implemented as a separate program or a SQL stored procedure.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. An event logging system for capturing event information associated with activity occurring in an application running on a server computer system configured to provide information to at least one client computer system, the event logging system comprising:
    an event identification routine operable to identify the occurrence of an event during the execution of the application and to transmit context information associated with the event; a database operable to receive and store the context information, wherein the database is a relational database utilizing a structured query language (SQL) and
    a database interface operable to transmit and receive the context information.

2. The event logging system of claim 1 wherein the application generates the information provided to the at least one client computer system.

3. The event logging system of claim 2 wherein the information provided to the at least one client computer system is product information for at least one of home insurance, life insurance, health insurance, automobile insurance, and renter's insurance.

4. The event logging system of claim 2 further comprising a web server application operable to receive, from the application, the information provided to the at least one client computer system, wherein the web server is operable to transmit the information provided to the at least one client computer system.

5. The event logging system of claim 1 wherein the application is a web server application.

6. The event logging system of claim 1 wherein the application includes at least one of the event identification routine and the database interface.

7. The event logging system of claim 1 wherein the server computer system includes a processor, and wherein at least one of the event identification routine and the database interface is encoded in a computer readable medium as instructions executable on the processor, the computer readable medium being one of a magnetic storage medium, an optical storage medium, and a communications medium conveying signals encoding the instructions.

8. The event logging system of claim 1 wherein the database interface is a SQL stored procedure operable to be invoked by the application.

9. The event logging system of claim 1 wherein the database interface is operable to add additional context information to the context information received from the event identification routine.

10. The event logging system of claim 1 wherein the client computer system is one of a plurality of interconnected client computer systems operating in a distributed computing environment and coupled to the server computer system.

11. The event logging system of claim 10 wherein the plurality of interconnected client computer systems and the server computer system are coupled via a network.

12. The event logging system of claim 11 wherein network is the Internet.

13. The event logging system of claim 1 wherein the event information associated with activity occurring in an application running on a server computer system has a business importance.

14. The event logging system of claim 1 wherein the event identification routine is further operable to produce an event table having a plurality of context fields and a plurality of associated context field values.

15. The event logging system of claim 1 wherein context information includes at least one of a program session identification, an event identification, an event type, a timestamp, a program identification, and a consumer identification.

16. The event logging system of claim 1 further comprising
- a database operable to receive and store the context information; and
- a database post-processor operable to modify the database.

17. The event logging system of claim 16 wherein the database is a relational database utilizing a structured query language (SQL), and wherein the database post-processor is a SQL stored procedure.

18. The event logging system of claim 16 wherein the database post-processor is operable to add additional context information associated with the event to the database.

19. The event logging system of claim 16 wherein the database post-processor is operable to modify context information associated with the event in the database and to store modified context information in one of the database and another database.

20. The event logging system of claim 16 wherein the database includes context information for a plurality of events, and wherein the database post-processor is operable to modify existing context information of a first one of the plurality of events based on context information of a second one of the plurality of events.

21. The event logging system of claim 16 wherein the database includes context information for a plurality of events, and wherein the database post-processor is operable to add additional context information for a first one of the plurality of events based on context information of a second one of the plurality of events.

22. The event logging system of claim 1 further comprising a database operable to receive and store the context information.

23. A method of logging event information associated with activity occurring in an application running on a server computer system configured to provide information to at least one client computer system, the method comprising:

identifying an occurrence of a predefined event during the execution of the application; a database operable to receive and store the context information, wherein the database is a relational database utilizing a structured query language (SQL)

transmitting context information associated with the event to a database.

24. The method of claim 23 wherein the identifying further comprises populating a table of fields with associated field values depending upon the context information.

25. The method of claim 24 wherein the transmitting further comprises transmitting the table of fields with associated field values to the database.

26. The method of claim 23 wherein the transmitting further comprises transmitting the context information to a database interface operable to transmit and receive the context information.

27. The method of claim 23 further comprising storing the transmitted context information in the database.

28. The method of claim 23 encoded in a computer readable medium as instructions executable on a processor, the computer readable medium being one of a magnetic storage medium, an optical storage medium, and a communications medium conveying signals encoding the instructions.

29. The method of claim 23 wherein the information provided to the at least one client computer system is product information for at least one of home insurance, life insurance, health insurance, automobile insurance, and renter's insurance.

30. The method of claim 23 wherein the context information includes at least one of a program session identification, an event identification, an event type, a timestamp, a program identification, and a consumer identification.

* * * * *

UNITED STATES PATENT AND TRADEMARK OFFICE
CERTIFICATE OF CORRECTION

PATENT NO. : 6,898,597 B1
DATED : May 24, 2005
INVENTOR(S) : Cook et al.

It is certified that error appears in the above-identified patent and that said Letters Patent is hereby corrected as shown below:

<u>Title page,</u>
Item [54], Title, should read -- EVENT LOG INFORMATION IN CLIENT-SERVER COMPUTER SYSTEM --.

Signed and Sealed this

Twenty-fifth Day of April, 2006

JON W. DUDAS
*Director of the United States Patent and Trademark Office*

US006898597C1

(12) EX PARTE REEXAMINATION CERTIFICATE (10712th)
United States Patent
Cook et al.

(10) Number: US 6,898,597 C1
(45) Certificate Issued: Sep. 21, 2015

(54) EVENT LOG INFORMATION IN CLIENT-SERVER COMPUTER SYSTEM

(75) Inventors: Gail A. Cook, San Carlos, CA (US); Atul B. Mahajan, Santa Clara, CA (US)

(73) Assignee: INTERNET PATENTS CORPORATION

Reexamination Request:
No. 90/012,848, May 1, 2013

Reexamination Certificate for:
Patent No.: 6,898,597
Issued: May 24, 2005
Appl. No.: 09/437,890
Filed: Nov. 9, 1999

Certificate of Correction issued Apr. 25, 2006

(51) Int. Cl.
*G06F 17/30* (2006.01)
*G06Q 30/02* (2012.01)

(52) U.S. Cl.
CPC ..................................... *G06Q 30/02* (2013.01)

(58) Field of Classification Search
None
See application file for complete search history.

(56) References Cited

To view the complete listing of prior art documents cited during the proceeding for Reexamination Control Number 90/012,848, please refer to the USPTO's public Patent Application Information Retrieval (PAIR) system under the Display References tab.

*Primary Examiner* — Joshua Campbell

(57) ABSTRACT

An event logging system that monitors for the occurrence of predefined web site usage events having some business significance, records the occurrence of those events, and also records the events' associated context information can advantageously address shortcomings of the prior art. The system includes a software event identification routine, executing within web server software or other web-related application software, that monitors for the occurrence of an event and gathers a desired set of related context information. A database interface, usable by one or more distinct web servers or applications, is used to insert the information into an event database. The event database can later be processed to add, modify, or delete event data, as well as prepare the data for integration into other databases or the preparation of reports.

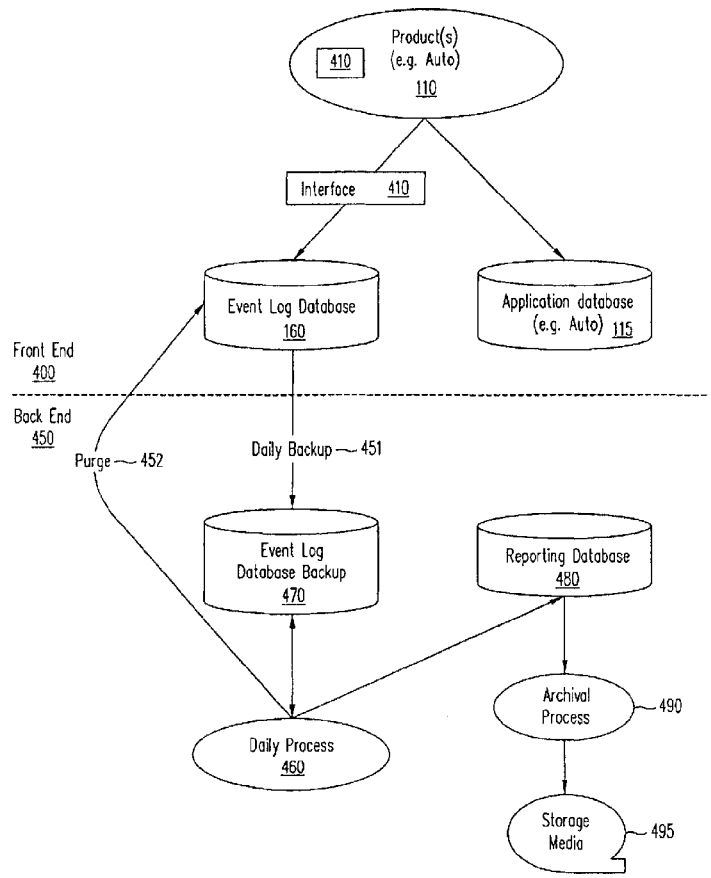

EX PARTE
REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1, 2, 4-28 and 30 are cancelled.

Claims 3 and 29 were not reexamined.

\* \* \* \* \*